United States Patent [19]
Couchman

[11] 3,868,841
[45] Mar. 4, 1975

[54] PROCESS AND MEANS FOR MAKING THICK END TUBE AND PIPE

[75] Inventor: Richard Couchman, New Kensington, Pa.

[73] Assignee: Aluminum Company of America, Pittsburgh, Pa.

[22] Filed: Mar. 30, 1973

[21] Appl. No.: 346,264

[52] U.S. Cl. .................................. 72/260, 72/265
[51] Int. Cl. ........................................ B21c 25/08
[58] Field of Search ............................. 72/260, 265

[56] References Cited
UNITED STATES PATENTS

| | | | |
|---|---|---|---|
| 3,296,848 | 1/1967 | Murphy | 72/265 |
| 3,362,208 | 1/1968 | Murphy | 72/265 |
| 3,709,013 | 1/1973 | Petsch | 72/265 |

Primary Examiner—C. W. Lanham
Assistant Examiner—Robert M. Rogers
Attorney, Agent, or Firm—Teare, Teare & Sammon

[57] ABSTRACT

A method and apparatus for extruding metallic tubes or pipe of varying wall thickness so as to maintain proper tube dimensions at the time of changing from one wall thickness to another during the extrusion operation. The apparatus includes an extrusion press having a ram with a mandrel slidably mounted therein and a stationary die. The mandrel has a stepped tip which is adapted to enter an opening in the die, and the maximum diameter of the mandrel is the same as the diameter of the die opening. The ram is advanced to extrude the flowable charge while one stepped portion of the mandrel tip is disposed within the die opening, but the ram is stopped while the mandrel is moved to present a different stepped portion of its tip to the die opening. At such time, the mandrel alone is moved to extrude the flowable material, and the mandrel is moved at a speed which is the same as the speed of the material, whereby at the time of the changeover the extrusion ratio of material flow to the speed of the mandrel is maintained at unity.

4 Claims, 4 Drawing Figures

PATENTED MAR 4 1975

3,868,841

PROCESS AND MEANS FOR MAKING THICK END TUBE AND PIPE

BACKGROUND OF THE INVENTION

This invention relates to an improved process and means for extruding metallic tubing and pipe, and particularly to tubing or pipe havng a wall which is relatively thick at one location along its length and relatively thin at another location along its length. Heretofore, tubes have been extruded upon a press which includes a die having an extrusion opening therein, a container adapted to sealably close with the die, a ram adapted to move axially toward the die and into the chamber, and a mandrel having a lesser cross-section and a larger cross section on its tip mounted to move axially within the ram and also into the chamber. Such mandrel is termed a stepped mandrel in the art and is directed into the die opening to vary the internal diameter of a constant outer diameter tube product which is being extruded. Experience has shown that, as the step on the mandrel approaches the die face to enter the die opening, while the ram is moving forwardly, the extruded material assumes a convergent form, with the result that the outside diameter of the tube is reduced during such phase of the extrusion. It is imperative, however, that the outside diameter of the tube remain constant in order to produce an acceptable product. The convergent flow of the material at the time of movement of the mandrel from one operative stepped portion to another stepped portion is believed to be caused by extrusion of the material at an extrusion ratio which is greater than unity.

SUMMARY OF THE INVENTION

The present invention contemplates the solution of the foregoing problem by making the tube extrusion speed equal to the speed of the mandrel as the mandrel step nears the die and enters the die opening. Normally, the material is extruded by a forward movement of the ram, but when the mandrel advances with the ram, the extrusion ratio, which is the ratio of the billet cross-sectional area to the tube cross-sectional area is greater than unity. The present invention reduces such ratio to unity, thereby keeping the step in the mandrel in contact with the step in the tube wall and eliminating any convergence in the flow at the time of changing from one to another stepped position of the mandrel with reference to the die opening. Unity of ratio as used herein means that the speed of the material is the same as the forward speed of the mandrel at the time of the change-over. Such unity ratio is accomplished at the time of the change-over by making the largest diameter of the mandrel substantially equal to the diameter of the die opening, and by arresting the movement of the ram, and using only the mandrel for extruding material unit the new stepped portion of the mandrel has been moved into the die opening. Thus, when the ram is arrested, and the mandrel is advanced, the shoulder formed by the forward end of the mandrel adjacent the tip operates to extrude material at a speed which is the same as the speed of the material. The design of the mandrel with relation to the size of the die opening combined with the cessation of movement of the ram results in a change in internal diameter of the extruded tube without altering the external diameter of the tube. Additionally, as the larger cross-sectional portion of the mandrel is moved axially into the die opening, the entire stepped tip of the mandrel is in contact with the inside surface of the tube during the transition, thereby supporting the tube and maintaining the desired internal dimension. For example, such "heavy end" tubes are made thicker at their ends so that they may be joined end-to-end to another with increased strength to provide a continuous pipe.

DESCRIPTION OF THE PREFERRED EMBODIMENTS

Figure 1:
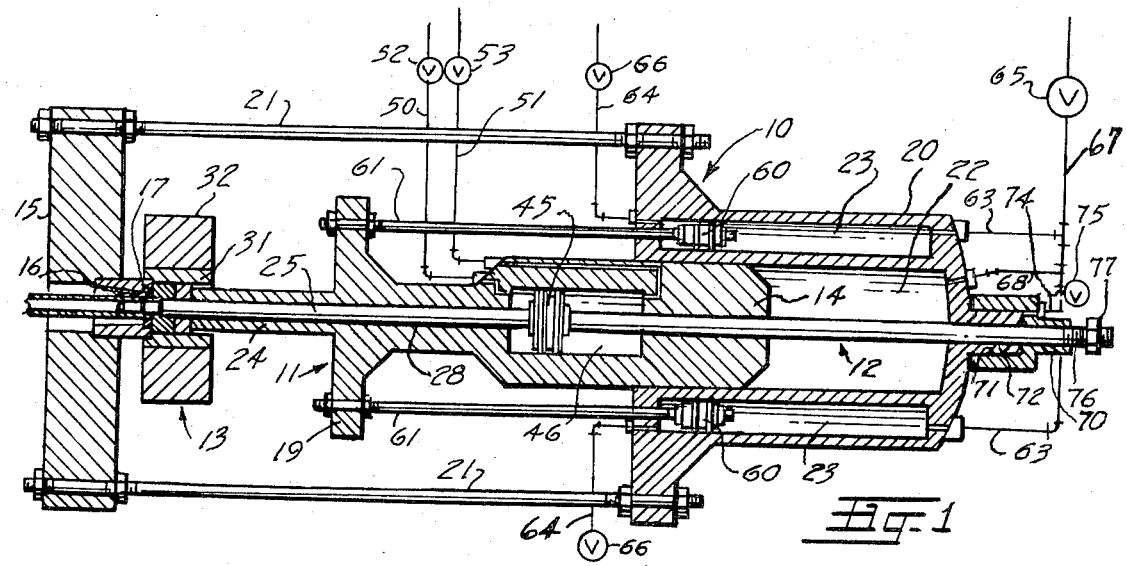
FIG. 1 is a longitudinal section through a typical extrusion press to which the present invention is applicable.

FIG. 1 illustrates, in diagrammatic form, a section through a typical extrusion press within which the process of the present invention can be carried out. In such illustration, 10 designates a stationary assembly, 11 a ram assembly, 12 a mandrel assembly and 13 a container assembly. In practice, the press is mounted horizontally and the ram and mandrel are moved by a pressurized hydraulic fluid from a suitable source of supply and under control of suitable valves, as known in the art.

The stationary assembly 10 is connected to a suitable foundation and includes a front platen 15, which supports a die back-up block 16 in which a die 17 (i.e., steel) is mounted. An opening in the die through which material is extruded is indicated at 18. The front platen 15 is shown as being connected to a ram cylinder 20 by tie rods 21, and the ram cylinder forms a ram chamber 22 and a plurality of pull-back chambers 23. The ram assembly 11 includes a piston-like body member 14 disposed for reciprocable sliding movement in the ram chamber 22. The member 14 mounts a crosshead 19 from which extends a forwardly disposed stem member 24, and both of which contain an axial bore 28 for slidably receiving a mandrel 25 therein. In the invention, the mandrel 25 has a maximum diameter which is equal to the diameter of the die opening 18 to provide a tight fit therewith, as will hereinafter be more fully described. Suitable hydraulic lines and valves control the flow of hydraulic fluid to the ram chamber 22 for advancing and retracting the ram assembly during the operation of the press.

Figure 2:
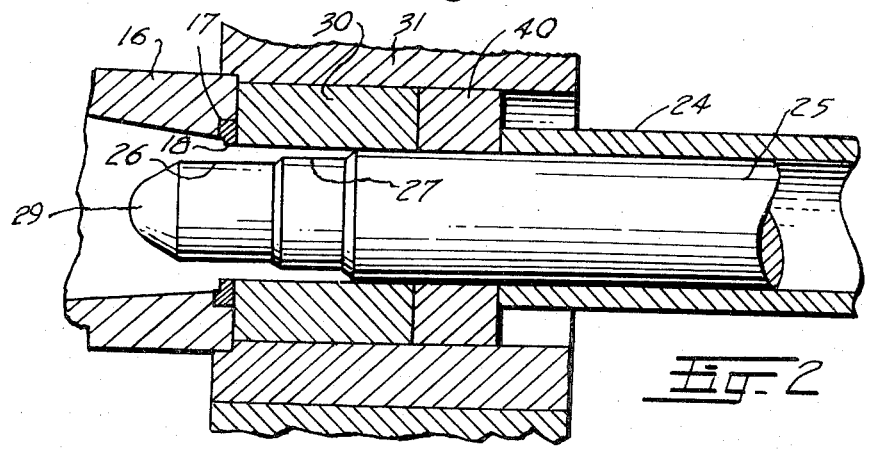
FIG. 2 is an enlarged fragmentary sectional view adjacent the extrusion end of the press of FIG. 1, but showing a blank or billet in pierced or hollow form prior to the extrusion thereof.

As shown in FIG. 2, the mandrel 25 has a stepped tip with one portion 26 of a relatively lesser cross-section and another portion 27 with a relatively larger cross-section. The portions 26 and 27 cooperate with the die opening 18 to produce a tube T having a relatively thick and a relatively thin wall portion, respectively, depending upon the position of the mandrel with respect to the die opening. Thus, in the position shown in FIG. 3, where the portion 26 of the mandrel is within the die opening, the tube T is being extruded with a relatively thick wall, whereas, when the portion 27 of the mandrel is within the die opening, the tube is being extruded with a relatively thin wall. The forward reduced portion 26 may be provided with a generally conical tip 29 to facilitate piercing of the material to be extruded.

The container assembly 13 includes an electrically heated container 31 which is mounted within a container carriage 32 for movement toward and away from the die 17 by suitable hydraulic means (not shown) as known in the art. In operation, the material to be extruded, which may be in the form of a solid, preheated billet 30 of metal, such as aluminum, is moved by a suitable loading device (not shown) together with a hollow dummy ram 40 into axial alignment with the container 31 and die opening 18. Upon actuation of the piston member 14, the stem member 24 pushes the ram 40 together with the billet into the container 31 to compress the billet which flows, in a solid plastic condition, through the space between the stepped portions 26, 27 of the mandrel and the die opening 18 to form the tube T.

Figures 3, 4:
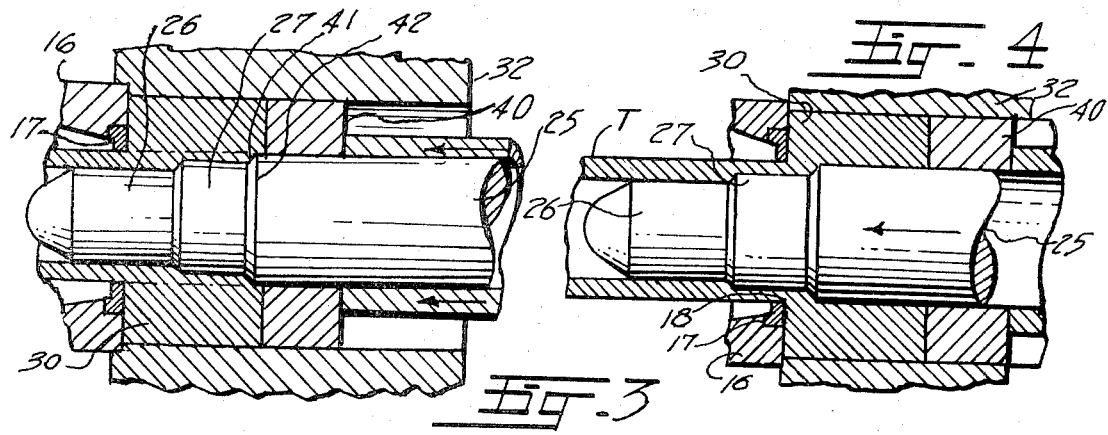
FIG. 3 is an enlarged fragmentary sectional view showing the relative position of the mandrel and ram after the ram has been advanced forwardly from the position shown in FIG. 2.
FIG. 4 is an enlarged fragmentary sectional view similar to FIG. 3, but showing the position of the mandrel after the transition has been made from one stepped portion to another stepped portion during the extruding operation.

In FIGS. 2 and 3, the smaller stepped portion 26 of the mandrel tip is shown as being within the die opening 18, but in FIG. 3 the ram 40 has been advanced until the forward end there of is adjacent the shoulder 41, which is formed between the larger stepped portion 27 of the mandrel and the end 42 of the mandrel. During such forward movement of the ram, the mandrel 25 has been held in stationary position by controlling the position of the piston 45 (FIG. 1) hydraulically within a chamber 46 in the ram body. Movement of the piston 45 is controlled by hydraulic fluid through hydraulic lines 50 and 51 and three-way valves 52 and 53, respectively, as known in the art.

FIG. 4 illustrates a relative position of the mandrel 25 and the ram 40 after the mandrel has been advanced with respect to the ram to move the relatively larger stepped portion 27 of the mandrel within the die opening 18. During such transfer, the ram 40 is held against axial movement, and at such time the flowable material 30 is extruded through the die opening by the shoulder 41 on the mandrel. Since the maximum diameter of the mandrel is equal to the diameter of the die opening, the material is extruded at the same rate of speed at which the mandrel is being advanced. In other words, the tube-to-mandrel-speed ratio is unity.

After the mandrel 25 has been advanced to the extent shown, for example, in FIG. 4, then further extrusion is obtained by a forward movement of the ram 40 while holding the mandrel stationary. During the transition stage, and with an extrusion ratio of unity, the tube T and mandrel are moved together and the mandrel, being in contact with the inside surface of the tube, supports the tube all through the transition. By this arrangement, it has been found that the face surface of the larger step position (i.e., shoulder 41) acts in the place of the ram 40 so as to extrude an amount of material corresponding to the crosssectional area of such face surface at the rate of its own movement, so that the speed of the mandrel and the extruded material through the die opening are the same or the ratio thereof is unity. Moreover, the next lesser step portion 27 (FIG. 4) is in the die opening to support the tube wall at the critical point of increase in the inside diameter (ID) of the tube, thereby to maintain the desired internal tube dimensions.

In the invention, the ram assembly including body 14, crosshead 19 and stem 24 may be moved axially toward and away from the front platen 15 via pistons mounted on the terminal ends of the pullback rods 61 within pullback chambers 23. The chambers 23 communicate through their rear walls with hydraulic lines 63 and through their forward walls with hydraulic lines 64 having valves 65, 66, respectively. The lines 63 communicate with a common line 67 controlled by valve 65. The ram chamber 22 communicates through its rear wall with hydraulic line 68 which, in turn, is connected to the common line 67. As shown, the rear of the ram cylinder 20 includes an integral piston-like retraction member 72 which has a bore 71 that communicates with the chamber 22. The mandrel 25 is disposed slidably into a movable stop 70 in the form of a cylinder which mates with the piston 72 and which communicates through its rear wall with hydraulic line 74 having a valve 75 connected to the common line 67. The rear surface of the stop 70 has a stop surface 76 which abuts with an adjustable stop nut 77 threadably mounted adjacent the terminal end of the mandrel 25. By this arrangement, the forward end of the mandrel 25 can be controllably positioned with reference to and through the die opening 18, in relation to the predetermined movement of the mandrel 25 in respect to movement of the ram assembly 11.

The following table is illustrative of size and other date of a machine for carrying out the present invention:

Diameter of Mandrel 25 is 3.75 inches
Diameter of step portion 27 is 2.928 inches
Diameter of step portion 26 is 2.848 inches
Length of mandrel from tip 29 to shoulder 41 is 3.06 inches
Length of step 27 is 1.5 inches
Length of step 26 is 1.56 inches
Length of tip 29 is 1.32 inches
Taper of shoulder 41 is about 45°
Taper of the nose 29 is about 45°
Inside diameter of the ram 40 is 3.760 inches and the outside diameter is 9.25 inches
Diameter of the die opening 18 is 3.75 inches
Outside diameter of the tube T is 3.75 inches
Volume of the billet 30 (aluminum) is 890 cu. in.
Temperature of the billet 30 is 850° F.
Speed of the ram 40 is 1 ft. per min.
Speed of the mandrel 25 is 1 ft. per min.

A preferred range in respect to the clearance or distance between the confronting inner surface of the die opening and that of the shoulder 41 at the critical point of changeover would be perhaps five times the least wall thickness of the tube, but it can be anything beyond two or three wall thicknesses that allow for some variation in stopping position of the main ram.

The process is applicable to a wide range of noncircular products as well as to circular products.

An advantage of the present invention is that tube dimensions are maintained during the operational changeover from one stepped portion to another of the mandrel. This result is accomplished by making the maximum diameter of the mandrel equal to the diameter of the die opening, and by using only the mandrel to extrude material while the changeover is being made. Such construction and operational procedure assures an extrusion ratio of unity during the critical phase of changing from one wall thickness to another while the press is in operation.

I claim:

1. In the operation of an extrusion press, a die having an extrusion opening therein, a container adapted to sealably close with said die, a ram adapted to move axially toward said die and into said chamber, and a mandrel having a stepped tip and being mounted to move axially within said ram and also into said chamber, the method of extruding a tube having a wall which is relatively thick at one location along its length, and relatively thin at another location along its length, which method comprises:

placing a charge of extrudable material in said container, positioning one of the stepped portions of the mandrel within the die opening, moving the ram forwardly into the container and toward the die, thereby extruding some of such charge through said die opening to form a wall of one thickness on the extruded tube, shifting the mandrel forwardly with reference to the die opening to form a wall of a different thickness on the extruded tube, continuing the extrusion during the forward shifting operation of the mandrel, stopping the forward movement of the ram and using only the mandrel to extrude material during the change over from extruding one wall thickness to another, and maintaining an extrusion ratio of unity during such forward shifting operation.

2. A method according to claim, 1 comprising resuming the extruding operation by movement of the ram after the changeover has been made.

3. A method according to claim 1, comprising moving the mandrel during the changeover at a rate of speed which corresponds to the rate of flow of the extruded material at a time of such changeover.

4. An extrusion press having in combination;

a frame, said frame having a chamber for receiving a charge of extrudable material, a die carried by the frame and being in communication with said chamber, a ram movably mounted on the frame for forcing extrudable material from the chamber through said die opening a mandrel having a stepped tip at its forward end and movably mounted within the ram, means for moving the mandrel forwardly with reference to the ram to insert stepped portions of progressively increased diameter within the die opening to form a wall which is relatively thick at one location and relatively thin at another location, said mandrel being cylindrical in form and having a maximum diameter equal to the diameter of the die opening, means for stopping the movement of the ram during the changeover from one stepped portion to another of the mandrel with reference to the die opening, and means for continuing the extrusion of material solely by the mandrel while the ram is held against movement.

* * * * *